Figure 1:
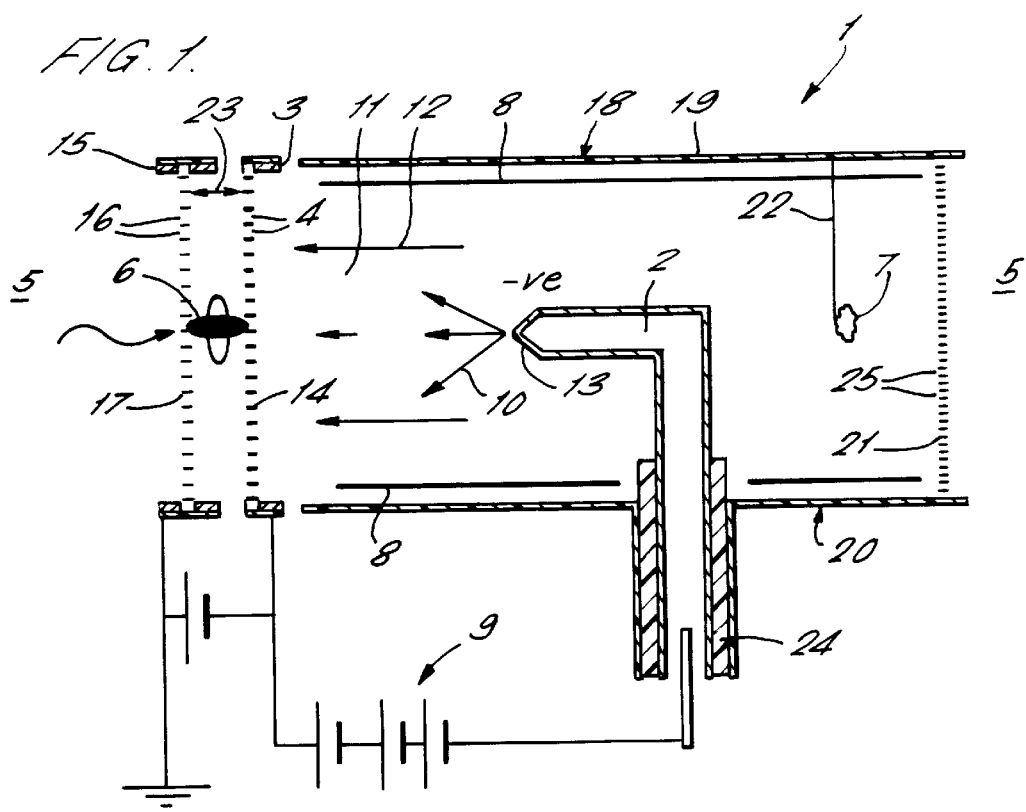

United States Patent [19]
Howse et al.

[11] Patent Number: 6,032,406
[45] Date of Patent: *Mar. 7, 2000

[54] INSECT TRAP DEVICE

[75] Inventors: Philip Edwin Howse, Hampshire; John Farrell Hughes; Graham Leslie Hearn, both of Southampton, all of United Kingdom

[73] Assignee: University of Southampton, Southampton, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,268

[22] Filed: Jun. 26, 1996

[30] Foreign Application Priority Data

Jun. 29, 1995 [GB] United Kingdom ................... 9513259

[51] Int. Cl.$^7$ ............................. A01M 1/14; A01M 1/22
[52] U.S. Cl. ............................... 43/114; 43/107; 43/112
[58] Field of Search ........................... 43/107, 112, 114, 43/132.1, 136, 139; 361/225, 226, 230–232

[56] References Cited

U.S. PATENT DOCUMENTS

| | | | |
|---|---|---|---|
| 3,638,058 | 1/1972 | Fritzius | 313/359.1 |
| 3,699,387 | 10/1972 | Edwards . | |
| 3,751,715 | 8/1973 | Edwards . | |
| 4,231,766 | 11/1980 | Spurgin | 96/79 |
| 4,689,915 | 9/1987 | Grothaus et al. | 43/112 |
| 4,812,711 | 3/1989 | Torok et al. | 315/111.91 |
| 4,907,365 | 3/1990 | Conigliaro, Jr. | 43/112 |
| 4,955,991 | 9/1990 | Torok et al. | 96/50 |
| 4,967,119 | 10/1990 | Torok et al. | 315/111.91 |
| 4,976,752 | 12/1990 | Torok et al. | 96/43 |
| 5,006,761 | 4/1991 | Torok et al. | 315/111.91 |
| 5,012,159 | 4/1991 | Torok et al. | 315/111.91 |
| 5,024,685 | 6/1991 | Torok et al. | 96/43 |
| 5,180,404 | 1/1993 | Loreth et al. | 96/56 |
| 5,184,417 | 2/1993 | Weldon | 43/107 |
| 5,215,558 | 6/1993 | Moon | 96/62 |
| 5,311,697 | 5/1994 | Cavanaugh et al. | 43/107 |
| 5,327,675 | 7/1994 | Butler et al. | 43/107 |
| 5,647,164 | 7/1997 | Yates | 43/132.1 |

FOREIGN PATENT DOCUMENTS

| | | | |
|---|---|---|---|
| 1060160 | 12/1983 | U.S.S.R. | 43/107 |
| 2011343 | 4/1994 | U.S.S.R. | 43/107 |
| WO 89/12389 | 12/1989 | WIPO . | |
| 0 650 322 | 5/1995 | WIPO . | |

*Primary Examiner*—Michael J. Carone
*Assistant Examiner*—Darren Ark
*Attorney, Agent, or Firm*—Fish & Richardson P.C.

[57] ABSTRACT

An insect trap device comprising a housing, the housing having an interior which is in communication with the atmosphere outside the device, the housing containing:

(i) an insect attractant source;
(ii) means for generating an ion wind to facilitate dispersal of the insect attractant source into the atmosphere outside the housing; and
(iii) insect retaining means.

22 Claims, 2 Drawing Sheets

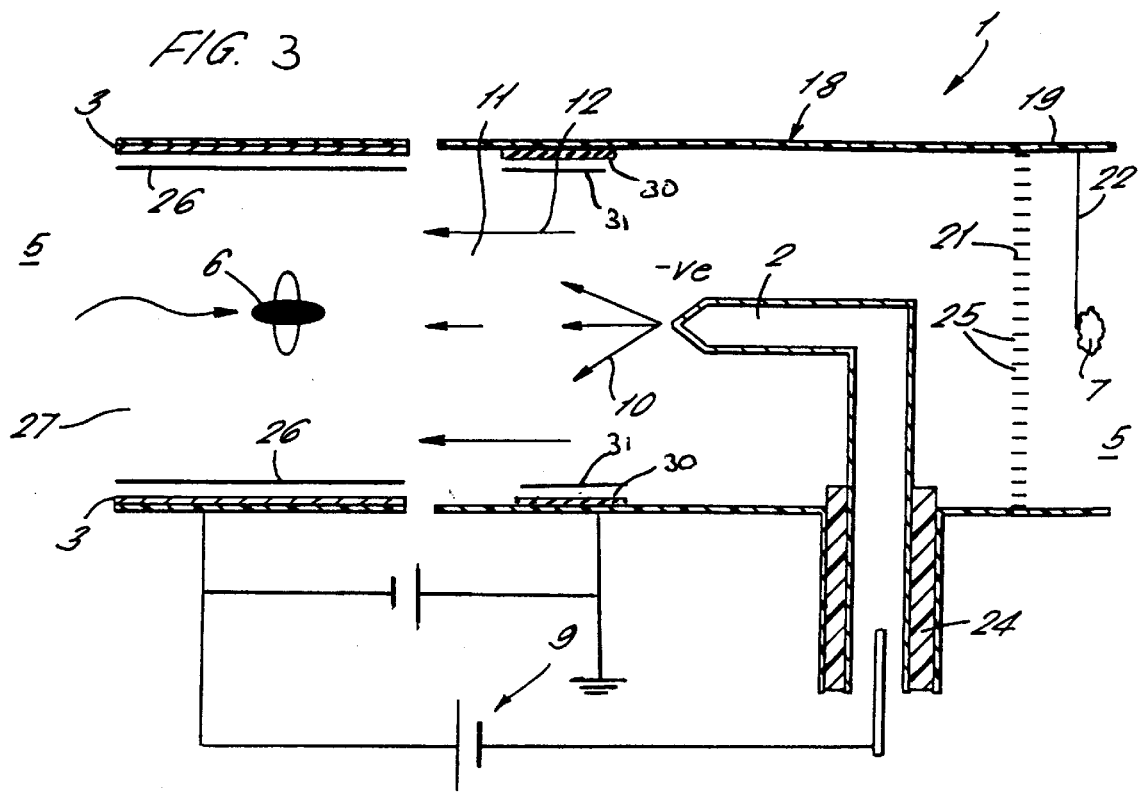

INSECT TRAP DEVICE

BACKGROUND OF THE INVENTION

The present invention relates to insect trap devices and, in particular, to insect trap devices which rely on an ion wind to facilitate dispersal of an insect attractant source.

PRIOR ART

Numerous trap devices have been developed for trapping insects, including no-exit traps, adhesive retaining traps, insecticide traps and electrical traps which electrocute the insects.

An example of a no-exit trap is the Victorian fly trap. This trap consists of a glass bowl with a central opening. The bowl is disposed such that the dome of the bowl is nearest a light source. Accordingly, insects entering the bowl via the opening continue to fly toward the light source but are trapped due to the presence of the dome.

An example of an adhesive retaining trap is the simple fly-paper, which retains insects on an adhesive surface when they land on it. Insecticide traps are constructed from a material impregnated with an insecticide. When an insect makes contact with the insecticide trap it absorbs insecticide and is killed. A disadvantage associated with fly-paper and insecticide traps is that they are unsightly in operation.

Electrical traps rely on a light source to attract insects. Attracted by the light, insects land on a metal grid raised to a high potential and are electrocuted as they bridge the gap between this grid and an earthed surface lying adjacent thereto. A problem with such devices is the shedding of particulate debris into the air after the insect has been electrocuted. Such debris is an undesirable health hazard, especially in food preparation areas. Additionally, light sources suitable for attracting insects can be damaging to human vision and, furthermore, some insects have now evolved behavioural resistance to light lures and traps of this kind.

EP-A-0650322 describes a method and apparatus for controlling pests in which the pests are exposed to particles carrying an electrostatic charge of opposite polarity to that of the surface of the pest and the particles having a pesticide or a behaviour modifying chemical associated therewith.

Heretofore, insect trap devices have not relied upon an ion wind to facilitate dispersal of an insect attractant source.

SUMMARY OF THE INVENTION

Accordingly, the present invention provides an insect trap device comprising a housing having an interior which is in communication with the atmosphere outside the device, the housing containing:

(i) an insect attractant source;

(ii) means for generating an ion wind to facilitate dispersal of the insect attractant source into the atmosphere outside the housing; and (iii) insect retaining means.

BRIEF DESCRIPTION OF THE DRAWINGS

FIG. 1 shows a schematic sectional drawing of one embodiment of an insect trap device according to the present invention.

FIG. 2 shows a schematic sectional drawing of another embodiment of an insect trap device according to the present invention, said device having only two electrodes.

FIG. 3 shows a schematic sectional drawing of another embodiment of an insect trap device similar to FIG. 2, but having a third electrode.

DETAILED DESCRIPTION OF THE INVENTION

Preferably the means for generating the ion wind comprises a first electrode and a second electrode spaced therefrom to define a region therebetween, such that when an electrical potential is applied across the first and second electrodes an electric field is created in said region.

The second electrode preferably has at least one opening therein through which the interior of the housing communicates with the atmosphere outside the housing.

Preferably the first electrode has a tip and the second electrode is preferably a ring electrode, a tubular electrode, a grid electrode or a combination of one or more thereof.

In one aspect of the present invention the insect retaining means comprises a surface in the interior of the device coated with an adhesive layer, an insecticide layer, or a combination thereof.

In another aspect of the present invention, the second electrode is, for example, in the form of a tube, grid or mesh coated on its surface with an adhesive layer, an insecticide layer, or a combination thereof for the purpose of retaining insects thereon. In this aspect of the present invention, the second electrode is preferably earthed.

In another aspect of the present invention, the insect retaining means comprises a third electrode positioned adjacent to the second electrode to define a gap therebetween, which gap is capable of being bridged by an insect incident on the second or third electrode. Preferably the third electrode has at least one opening therein through which the interior of the housing communicates with the atmosphere outside the housing. The third electrode is preferably a ring electrode, a tubular electrode, a grid or mesh electrode, a disc electrode, or a combination of one or more thereof. When the device is in operation, i.e. when an electrical potential is applied across the first and second electrodes, the third electrode is maintained at a lower potential than the potential across the first and second electrodes. Preferably the third electrode is earthed. The retaining means in this aspect of the present invention may further comprise a surface coated with an adhesive layer, an insecticide layer, or a combination thereof and positioned adjacent to the second and third electrodes. Preferably the surface is earthed.

In yet another aspect of the present invention, the insect retaining means comprises a third electrode positioned substantially between the first and second electrodes such that an insect which has entered the device may be deposited thereon. When the device is in operation, i.e. when an electrical potential is applied across the first and second electrodes, the third electrode is maintained at a lower potential than the potential across the first and second electrodes. In a preferred embodiment of this aspect of the present invention, the third electrode comprises a tubular insert which substantially surrounds the electric field created in the space between the first and second electrodes when an electrical potential is applied across the first and second electrodes. The third electrode is preferably coated with an adhesive layer, an insecticide layer, or a combination thereof and preferably is earthed.

The electrodes in the insect trap device according to the present invention are preferably formed from an electrically conducting material, more preferably from a metallic material, such as copper.

The insect attractant source may be a sexual pheromone or chemical. For houseflies (*Musca domestica*) the sexual pheromone (Z)-9-tricosene is a preferred insect attractant source; whilst for mosquitoes, a carbon dioxide generating source or lactic acid are the preferred attractant sources.

When the device according to the present invention is operating, the electrical potential applied across the first and second electrodes is preferably a d.c. potential, which may be supplied from a mains operated supply, or from a battery. Depending upon the separation of the first and second electrodes, potentials of up to approximately 20 kV may be applied. The preferred polarity is for the first electrode to be negative with respect to the second electrode.

The insect trap device according to the present invention may also comprise an insect retaining mesh. Furthermore, the insect trap device may comprise an air filter to filter out dust and particles in the air which passes through the interior of the device. The air filter is preferably detachable from the insect trap device so that it may be cleaned or replaced, as necessary.

It will be understood that the insect trap device according to the present invention may include additional features which are attractive to insects, such as a source of heat, light or sound, or a combination thereof, or a pulsed air flow.

The present invention also provides a method of trapping insects comprising the steps of:
(1) providing a housing having an interior which is in communication with the atmosphere outside the housing;
(2) providing an insect attractant source in the interior of the housing;
(3) generating an ion wind in the interior of the housing to facilitate dispersal of the insect attractant source into the atmosphere outside the housing; and
(4) retaining the insects which are attracted to the insect attractant source by means of an insect retaining means provided in the interior of the housing.

Additionally, the present invention provides a method of trapping insects comprising the steps of:

(a) providing an insect trap device according to the present invention having a first electrode and a second electrode; and (b) applying an electrical potential across the first and second electrodes such that the resultant electric field in the region therebetween generates an ion wind which flows towards the second electrode, the ion wind facilitating the dispersal of the insect attractant source into the atmosphere outside the housing, whereby insects in the atmosphere outside the housing are attracted to the insect attractant source and pass through at least one opening in the second electrode into the housing and are retained therein by the insect retaining means.

The insect trap device and method according to the present invention rely on an electric field to facilitate dispersal of an attractant source odour and, additionally, to bring about electrocution of insects or diversion thereof to a surface whereon they may be retained and subsequently killed. It will be understood that the insect trap device and method according to the present invention may also be used to trap other pests such as flying or crawling invertebrate pests, including cockroaches. Additionally, it will be understood that the insect trap device and method according to the present invention may also serve to filter particulate material from the atmosphere.

The invention will now be described by way of example with reference to the accompanying drawings:

Referring to FIG. 1, an insect trap device 1 of the present invention is shown. The device 1 comprises a housing 18 of a substantially insulating material, such as glass or plastic, having upper and lower sides 19 and 20, respectively. Protruding into the interior of the housing 18 and attached to side 20 is a first electrode 2, comprising an L-shaped copper rod which tapers to a rounded tip 13. A surround 24 is provided to electrically insulate the first electrode 2 from the housing 18.

Second 3 and third 15 electrodes are positioned in the housing 18 at one end thereof. The second electrode 3 is in the form of a grid or mesh 14 having a plurality of openings 4 therein which communicate with the atmosphere 5 outside the device 1. Similarly, the third electrode 15 is also in the form of a grid or mesh 17 having a plurality of openings 16 therein which communicate with the atmosphere 5 outside the device 1. The openings in the grids or meshes 14 and 17 are preferably offset from each other. The openings 4 and 16 are of a size that allows an insect 6 to pass through into the housing 18. Positioned at the other end of the housing 18 is an insect retaining mesh 21 having a plurality of openings 25 therein which communicate with the atmosphere 5 outside the device 1. The openings 25 are of a size that prevents insects passing through the insect retaining mesh 21. Accordingly, air can travel through the housing 18 of the device 1. The retaining mesh 21 may have an air filter associated therewith, as described above.

An insect attractant source 7 is suspended by a wire 22 from the upper side 19 of the housing 18.

When a d.c. electrical potential from a source 9 of 5–20 kV is applied to the first 2 and second 3 electrodes, the potential difference between the first 2 and second 3 electrodes results in an electric field 10 in the space 11 between the electrodes. The electric field 10 in the vicinity of the first electrode 2 is proportional to the electrical potential applied and approximately inversely proportional to the radius of the tip 13 of the copper rod forming the first electrode 2. When the electric field 10 between the first 2 and second 3 electrodes is of sufficient strength, atoms and molecules in the atmosphere in the region near the tip 13 of the first electrode 2 become polarised and are drawn towards the surface of the tip 13. In a complex process, the atoms and molecules then become ionized and are subsequently repelled from the first electrode 2 towards the second electrode 3. This flow of ions in an electric field is termed an "ion wind" and is represented in FIG. 1 by the arrows 12. As the ions in the ion wind travel towards the second electrode 3, they impart kinetic energy to non-ionised particles with which they collide, resulting in an air current which also flows towards the second electrode 3. Since the second 3 and third 15 electrodes have a plurality of openings 4 and 16, respectively therein, the air current flows through the second 3 and third 15 electrodes into the atmosphere 5 outside the housing 18. Accordingly, the odour of the insect attractant source 7 is carried in the flow of the ion wind 12 and is subsequently dispersed in the atmosphere 5 outside the housing 18.

It is well-known that many insects are attracted towards odour sources, which may represent food or mating sources. The most important mechanism involved in this attraction is upwind orientation in the "plume" of the odour carried by air currents passing over an insect attractant source.

An important aspect of the present invention is therefore the novel use of an ion wind generator to produce an odour plume, from an insect attractant source, of controlled low velocity which insects use as an orientation guide to approach the source of the odour.

Accordingly, insects 6 in the atmosphere 5 outside the housing 18 are attracted to the insect attractant source 7 by the odour thereof dispersed in the atmosphere 5. The insects 6 orientate upwind, using the odour plume as a guide, and pass through the openings 16 in the third electrode 15. The third electrode 15 is earthed and positioned adjacent to the second 3 electrode to define a gap 23 therebetween. In order to trap relatively large insects, such as houseflies, the sizes of the openings of the meshes 4 and 16 are chosen so that the insects will pass through the mesh 16 but not through the mesh 4. Alternatively this can be achieved by offsetting the openings in the two meshes. As the insects land on electrode 3 the gap 23 between the electrodes is bridged 6, so producing an electrical short-circuit whereby the insect 6 is electrocuted. It will be understood that the size of the gap 23 is chosen having regard to the dimensions of the insects.

An earthed surface 8 is positioned between the first 2 and second 3 electrodes. The earthed surface 8 comprises a coating of an adhesive layer so that particles of debris from the electrocuted insects which pass through the mesh 14 may be retained thereon.

In order to trap smaller insects, such as mosquitoes, which are able to pass through both of the meshes 17 and 14 a different mechanism operates. As these smaller insects enter the housing 18 by passing through the openings 4 in the mesh 14, they are influenced by the electrical field 10 between the first electrode 2 and the second electrode 3. The insects accumulate electrical charge in the field and precipitate onto the earthed surface 8 of the device.

The voltage applied to the first 2 and second 3 electrodes may be adjusted depending upon the velocity and direction of air movement required.

Additionally, the second electrode 3 may have a cut-out device (not shown) so that when the grid 14 of the electrode is shorted by an insect landing upon it the electrical supply to the first electrode 2 is cut off, thereby stopping the ion wind flow. This would make it more likely that the debris from an electrocuted insect would be retained in the trap and would also act as a safety device. Furthermore, the capture of debris from the electrocuted insects could be ensured by extending the housing beyond the electrode 15 and providing it with an appropriate adhesive coating.

Figure 2:
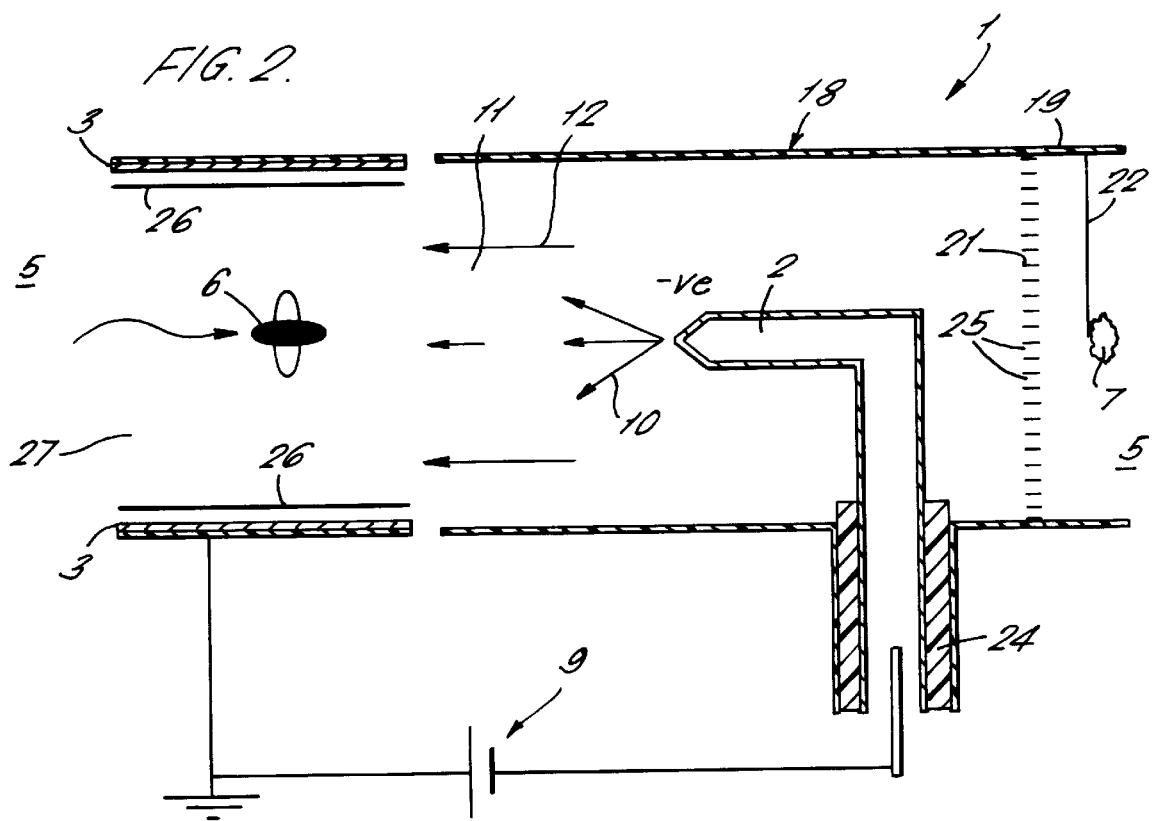

Referring to FIG. 2, another embodiment of an insect trap device 1 according to the present invention is shown.

The device 1 is similar to that shown in FIG. 1 except that the insect retaining means is different. In this embodiment, the second electrode 3 is earthed and is in the form of a tube coated on its inner surface 26 with an adhesive layer, an insecticide layer or a combination thereof. The second electrode 3 has an opening 27 therein which communicates with the atmosphere 5 outside the device 1. The opening 27 is of a size that allows an insect 6 to pass through into the housing 18. When an insect 6 enters the housing 18 via the opening 27 in the second electrode 3 it is influenced by the electrical field 10 between the first electrode 2 and the second electrode 3. The insect 6 accumulates electrical charge in the field and, accordingly, is attracted towards the second electrode 3 and is deposited onto the surface 26 and retained thereon.

Referring to FIG. 3, another embodiment of an insect trap device 1 according to the present invention is shown.

The device 1 is similar to that shown in FIG. 2 except that it comprises a third electrode 30, positioned between the first 2 and second 3 electrodes such that an insect which has entered the device may be deposited on said third electrode 30. The third electrode 30 is coated 31 with an adhesive layer, an insecticide layer or a combination thereof. When an electrical potential is applied across the first 2 and second 3 electrodes, the third electrode 30 is maintained at a lower potential.

The embodiments of the present invention shown in FIG. 2 and FIG. 3 are suitable for trapping small insects, such as mosquitoes, which behave as small particles when under the influence of an electric field. However, larger insects, such as blowflies and wasps, are less susceptible to the influences of the electric field and, accordingly, the embodiment of the present invention shown in FIG. 1, wherein the insect is electrocuted, is more suitable for such purposes.

The insect trap device according to the present invention has many advantages over the insect trap devices according to the prior art. For example, the trap device according to the present invention does not rely solely on a light source to attract insects. Some light sources in common use can be damaging to human vision because of their ultraviolet content and, furthermore, some flies have now evolved behavioural resistance to light lures.

The presence of an earthed surface limits the shedding of particulate debris into the air after the insect has been killed. Such debris is an undesirable health hazard, especially in food preparation areas.

The insect trap device according to the present invention is less unsightly in operation than fly papers.

Some insect attractant sources, such as Z-(9)-tricosene, are relatively involatile and the ion wind provides an effective means for dispersing the odour of the attractant into the atmosphere.

We claim:

1. An insect trap device comprising a housing, said housing having an interior which is in communication with the atmosphere outside the device, the housing containing:
   (i) an insect attractant source;
   (ii) means for generating and maintaining an ion wind to facilitate dispersal of a plume of insect attractant into the atmosphere outside the housing, comprising a first electrode and a second electrode spaced from said first electrode, a region defined between said first and second electrodes, such that when an electrical potential is applied across said first and second electrodes an electric field is created in said region, said ion wind being the sole agent for dispersal of the insect attractant; and (iii) insect retaining means.

2. The insect trap device according to claim 1, wherein the second electrode has at least one opening therein through which the interior of the housing communicates with the atmosphere outside said housing.

3. The insect trap device according to claim 1 wherein the second electrode is selected from the group consisting of a ring electrode, a tubular electrode, a grid electrode, and a combination thereof.

4. The insect trap device according to claim 1 wherein the first electrode has a tip.

5. The insect trap device according to claim 1 wherein the second electrode is earthed.

6. The insect trap device according to claim 1 wherein the second electrode is coated with a coating selected from the group consisting of an adhesive layer, an insecticide layer, and a combination thereof.

7. The insect trap device according to claim 1 wherein the insect retaining means comprises a surface in the interior of the device coated with a coating selected from the group consisting of an adhesive layer, an insecticide layer, and a combination thereof.

8. The insect trap device according to claim 1 wherein the insect attractant source comprises an insect pheromone.

9. The insect trap device according to claim 8 further comprising an additional insect attractant selected from the group consisting of a source of heat, light or sound, and a combination thereof.

10. An insect trap device comprising a housing, said housing having an interior which is in communication with the atmosphere outside the device, the housing containing:
   (i) an insect attractant source;
   (ii) means for generating and maintaining an ion wind to facilitate dispersal of a plume of insect attractant into the atmosphere outside the housing, comprising a first electrode and a second electrode spaced from said first electrode, a region defined between said first and second electrodes, such that when an electrical potential is applied across said first and second electrodes an electric field is created in said region, said ion wind being the sole agent for dispersal of the insect attractant; and (iii) insect retaining means comprising a third electrode positioned adjacent said second electrode, a gap defined between said second electrode and said third electrode, said gap being so dimensioned as to be bridgeable by an insect.

11. The insect trap device according to claim 10, wherein each of the second and third electrodes has at least one opening through which the interior of the housing communicates with the atmosphere outside said housing.

12. The insect trap device according to claim 10 wherein the third electrode is selected from the group consisting of a ring electrode, a tubular electrode, a grid electrode, and a combination thereof.

13. The insect trap device according to claim 10, further comprising a surface coated with a coating selected from the group consisting of an adhesive layer, an insecticide layer, and a combination thereof, said surface being positioned adjacent the second and third electrodes, and said surface optionally being earthed.

14. The insect trap device according to claim 10 wherein the insect attractant source comprises an insect pheromone.

15. The insect trap device according to claim 14 further comprising an additional insect attractant selected from the group consisting of a source of heat, light or sound, and a combination thereof.

16. An insect trap device comprising a housing, said housing having an interior which is in communication with the atmosphere outside the device, the housing containing:

(i) an insect attractant source;

(ii) means for generating and maintaining an ion wind to facilitate dispersal of a plume of insect attractant into the atmosphere outside the housing, comprising a first electrode and a second electrode spaced from said first electrode, a region defined between said first and second electrodes, such that when an electrical potential is applied across said first and second electrodes an electric field is created in said region, said ion wind being the sole agent for dispersal of the insect attractant; and (iii) insect retaining means, comprising a third electrode positioned substantially between said first and second electrodes in a manner such that an insect which has entered the device can be deposited thereon.

17. The insect trap device according to claim 16, wherein each of the second and third electrodes has at least one opening through which the interior of the housing communicates with the atmosphere outside said housing and said third electrode is a tubular insert which substantially surrounds an electric field which is created in the region between the first and second electrodes when an electrical potential is applied across said first and second electrodes.

18. The insect trap device according to claim 17 wherein the third electrode is coated with a coating selected from the group consisting of an adhesive layer, an insecticide layer and a combination thereof, and said third electrode is optionally earthed.

19. The insect trap device according to claim 16 wherein the insect attractant source comprises an insect pheromone.

20. The insect trap device according to claim 19 further comprising an additional insect attractant selected from the group consisting of a source of heat, light or sound and a combination thereof.

21. A method of trapping insects comprising the steps of:

(a) providing an insect trap device comprising a housing, said housing having an interior which is in communication with the atmosphere outside the device, the housing containing:

(i) an insect attractant source, (ii) means for generating and maintaining an ion wind to facilitate dispersal of a plume of insect attractant into the atmosphere outside the housing, comprising a first electrode and a second electrode spaced from said first electrode, a region defined between said first and second electrodes, such that when an electrical potential is applied across said first and second electrodes, an electric field is created in said region; and (iii) insect retaining means comprising (A) a third electrode positioned adjacent said second electrode, a gap defined between said second electrode and said third electrode, said gap being so dimensioned as to be bridgeable by certain insects, and (B) a surface in the interior of the housing coated with an adhesive, an insecticide or a combination thereof, each of said second and third electrodes having at least one opening through which the interior of said housing communicates with the atmosphere outside said housing, and (b) applying an electrical potential across the first and second electrodes such that the resultant electric field in the region therebetween generates an ion wind which flows towards the second electrode, the ion wind being the sole agent for facilitating the dispersal of the insect attractant plume into the atmosphere outside the housing, whereby insects in the atmosphere outside the housing are attracted to the insect attractant source and pass into the housing through the at least one opening in the third electrode, insects of sufficient size to bridge the gap between the third and second electrodes produce a short circuit and are electrocuted, whilst smaller insects pass through the at least one opening of the second electrode and are retained therein by the coated surface of said housing.

22. A method of trapping insects comprising the steps of:

(a) providing an insect trap device comprising a housing, said housing having an interior which is in communication with the atmosphere outside the device, the housing containing:

(i) an insect attractant source, (ii) means for generating and maintaining an ion wind to facilitate dispersal of a plume of insect attractant into the atmosphere outside the housing, comprising a first electrode and a second electrode spaced from said first electrode, a region defined between said first and second electrodes such that when an electrical potential is applied across said first and second electrodes, an electric field is created in said region, and (iii) insect retaining means comprising a third electrode positioned substantially between said first and second electrodes in a manner such that an insect which has entered the device may be deposited thereon, each of said second and third electrodes having at least one opening through which the interior of the housing communicates with the atmosphere outside said housing, and (b) applying an electrical potential across the first and second electrodes such that the resultant electric field in the region therebetween generates an ion wind which flows towards the second electrode, the ion wind being the sole agent for facilitating the dispersal of the insect attractant plume into the atmosphere outside the housing, whereby insects in the atmosphere outside the housing are attracted to the insect attractant source and pass into the housing through the at least one opening in the second electrode and are retained therein by the insect retaining means.

* * * * *